United States Patent [19]
Moss et al.

[11] Patent Number: 6,161,759
[45] Date of Patent: Dec. 19, 2000

[54] BAR CODE READER

[75] Inventors: Patrick S. Moss; Douglas A. Barry, both of Omaha, Nebr.

[73] Assignee: Lab Interlink, Inc., Omaha, Nebr.

[21] Appl. No.: 09/199,230

[22] Filed: Nov. 24, 1998

[51] Int. Cl.[7] ...................................................... G06K 7/10
[52] U.S. Cl. ................................. 235/462.01; 235/462.43
[58] Field of Search .................................... 235/375, 457, 235/462.01, 462.13, 462.14, 462.32, 462.34, 462.43

[56] References Cited

U.S. PATENT DOCUMENTS

| | | | |
|---|---|---|---|
| 4,939,355 | 7/1990 | Rando et al. ........................ | 235/462.14 |
| 5,019,714 | 5/1991 | Knowles ............................. | 235/462.14 |
| 5,801,370 | 9/1998 | Katoh et al. ........................ | 235/462.01 |

*Primary Examiner*—Thien M. Le
*Assistant Examiner*—Larry D Taylor
*Attorney, Agent, or Firm*—Koley Jessen P.C., A Limited Liability Organization; Mark D. Frederiksen

[57] ABSTRACT

A scanning apparatus includes a pair of operable scanners which project scan beams along beam paths that reflect off of a back mirror. Each beam path has an initial portion prior to reflection off the back mirror, and a reflected portion after reflection. A passageway is created which crosses through both the initial and reflected portions of both beam paths such that the scan beams cover the entire perimeter side wall of the object.

11 Claims, 4 Drawing Sheets

BAR CODE READER

TECHNICAL FIELD

The present invention relates generally to apparatus for scanning or reading bar codes, and more particularly to an improved apparatus capable of scanning the entire perimeter of an object to read a bar code thereon.

BACKGROUND OF THE INVENTION

Bar code readers are utilized in a wide variety of industries to scan information recorded on a label, and processing or storing that information. However, one drawback of prior art bar code readers is the fact that the label with the bar code thereon must be specifically positioned within the beam path of the scanner in order to be "read".

While in many cases there is no problem in orienting a container in order to position a bar code for scanning by a bar code reader, there are instances where it would be more efficient and economical to be assured that a bar code is read with a single pass of a container past a bar code reader, without having to specifically orient the container during the pass. One particular instance is in the laboratory setting, wherein tubes and vials of laboratory specimens are transported via conveyors or robotic arms to various testing facilities. It is difficult, and inefficient, to require a robotic arm to detect the location of a label on a container, and then rotate or move the container such that the label is positioned approximately for a bar code reader to scan the label.

SUMMARY OF THE INVENTION

It is therefore a general object of the present invention to provide an improved bar code reading apparatus.

A further object is to provide an improved bar code reader which is capable of scanning a coded label on a container with a single pass of the container through the reader.

Still another object of the present invention is to provide a bar code reader which does not require manipulation of the container and coded label relative to the bar code reader.

These and other objects of the present invention will be apparent to those skilled in the art.

The scanning apparatus of the present invention includes a pair of operable scanners which project scan beams along beam paths that reflect off of a back mirror. Each beam path has an initial portion prior to reflection off the back mirror, and a reflected portion after reflection. A passageway is created which crosses through both the initial and reflected portions of both beam paths such that the scan beams cover the entire perimeter side wall of the object.

DESCRIPTION OF THE PREFERRED EMBODIMENT

Figure 1:
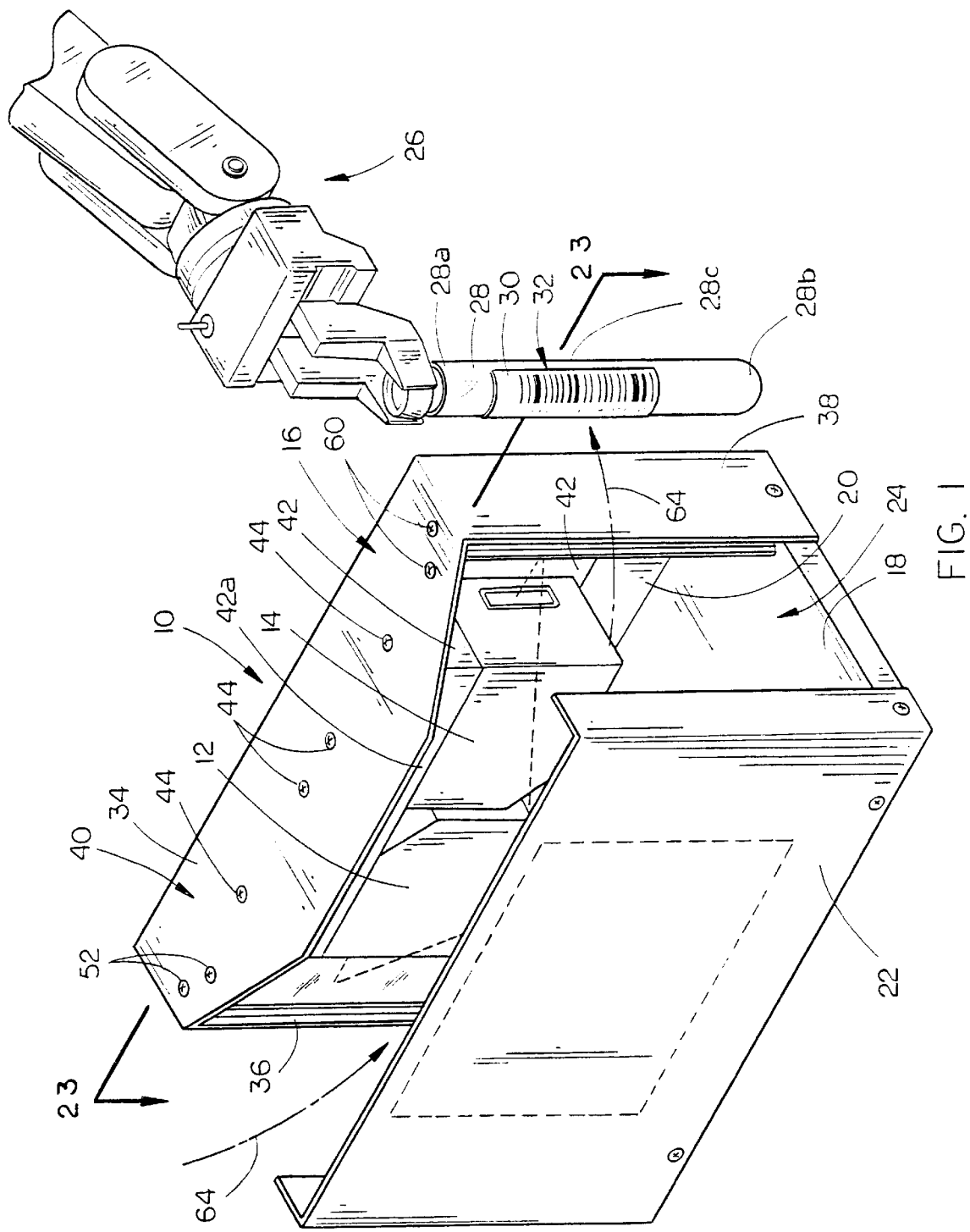
FIG. 1 is a perspective view of the bar code reader of the present invention with a robotic arm holding a specimen tube subsequent to passage through the reader.

Referring now to the drawings, in which similar or corresponding parts are identified with the same reference numeral and more particularly to FIG. 1, the bar code reader of the present invention is designated generally at 10 and includes a pair of first and second scanners 12 and 14 mounted within a housing 16.

Housing 16 includes a base plate 18 with opposing spaced apart forward and rearward walls 20 and 22 projecting vertically upwardly therefrom. Forward and rearward walls 20 and 22 are spaced apart a distance to form a passageway 24 therebetween.

FIG. 1 shows a robotic arm 26 grasping the upper end of a specimen container 28, for transporting container 28 from one location to another. Although specimen container 28 is shown in the form of a tube, many other shapes and configurations could be utilized in association with the bar code reader 10 of the present invention. A label 30 is mounted on container 28 between the upper and lower ends 28a and 28b of container 28 on the circumferential side wall 28c thereof. Label 30 includes printed indicia thereon which is designated generally at 32. Printed indicia 32 may be bar code, printed characters, or any other representation of information which may be scanned or detected. Similarly, although the printed indicia 32 is shown in bar code form in a vertical orientation, other orientations would work equally as well, and are intended to be included within the scope of the invention.

Forward wall 20 includes a top plate 34 which projects rearwardly from the upper edge thereof to overhang base plate 18. A pair of opposing side walls 36 and 38 extend rearwardly from the vertical side edges of forward wall 20 and extend between top plate 34 and base plate 18 to form an enclosure designated generally at 40 which is open rearwardly towards passageway 24.

First and second scanners 12 and 14 are both mounted on a generally L-shaped support bracket 42, with a horizontal leg 42a of the bracket secured to top plate 34 by screws 44. The depending leg 42b of support bracket 42 supports scanners 12 and 14 generally midway between base plate 18 and to plate 34.

Figure 2:
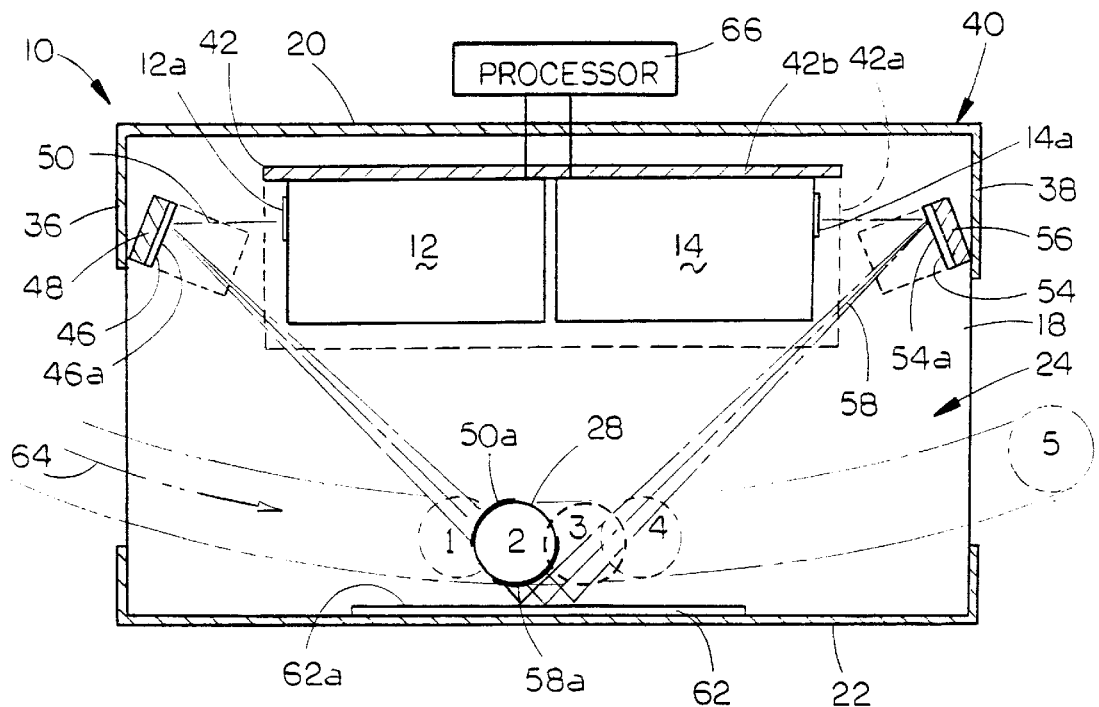
FIG. 2 is a sectional view taken at lines 2—2 in FIG. 1, with a container positioned for direct scanning.

As shown in FIG. 2, scanners 12 and 14 each include a window 12a and 14a through which a scanner beam will project. Scanners 12 and 14 are preferably mounted on bracket 42 with windows 12a and 14a positioned in opposing directions, towards side walls 36 and 38 respectively.

A first mirror 46 is supported in a vertical orientation on a support bracket 48 and oriented with its reflecting surface 46a in the beam path 50 of first scanner 12. Bracket 48 is adjustably mounted to top plate 34 with screws 52 in a conventional fashion, to permit adjustment of the angle of mirror 46 relative to beam path 50.

A second mirror 54 is similarly mounted on a support bracket 56 and has a reflecting surface 54a located in the bema path 58 of second scanner 14. Bracket 56 is adjustably mounted to top plate 34 with screws 60.

A large back reflection mirror 62 is mounted on rearward wall 22 with its reflecting surface 62a facing towards scanners 12 and 14. Back mirror 62 is positioned generally midway between first and second mirrors 46 and 54, and located vertically to fall within both beam paths 50 and 58 of scanners 12 and 14, after reflection from mirrors 46 and 54.

In operation, bar code reader 10 is positioned with passageway 24 located such that movement of specimen container 28 by robotic arm 26 will pass through passageway 24, as shown by container pathway arrows 64 in FIG. 1. Typically, container pathway 64 is any short section of a pathway conventionally utilized by a robotic arm 26 or other apparatus for moving containers 28, so that it is not necessary to separately manipulate or re-orient the specimen container 28 from its original pathway.

Figure 3:
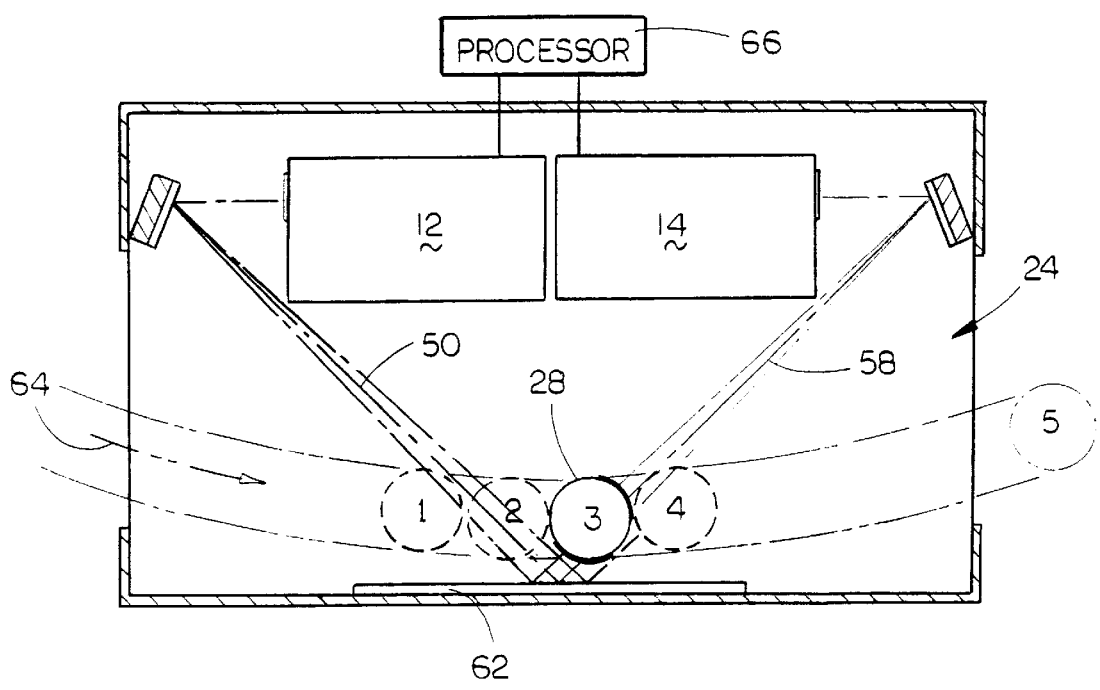
FIG. 3 is a sectional view taken at lines 3—3 in FIG. 1, with a container positioned for reflected scanning.

Referring now to FIGS. 2 and 3, first and second mirrors 46 and 54 are positioned to reflect the beam paths 50 and 58 from scanners 12 and 14 to a central portion of back mirror 62. It can be seen that beam paths 50 and 58 expand proportional to the distance away from the associated window 12a and 14a of its scanner 12 and 14. Thus, the greater the distance that scanners 12 and 14 are located from the object to be scanned, the greater the area that can be scanned (so long as the object is located within the maximum distance range of the scanner).

FIGS. 2 and 3 show five positions of container 28 as it moves along pathway 64 within channel 24. In FIG. 2, position 2 is shown in solid line, and shows two scan areas 50a and 58a on container 28 which are scanned by scanners 12 and 14 respectively. It can be seen that scanner 12 has a beam path 50 which covers approximately one-fourth to one-third of a forward portion of the circumferential surface of container 28. Simultaneously, beam path 58 of scanner 14 reflects off back mirror 62 to scan approximately one-fourth to one-third of a rearward portion of the perimeter surface of container 28. As container 28 moves from position 2 to position 3 (shown in FIG. 3), beam path 50 reflects off of mirror 62 to scan a portion of the rearward surface of container 28, rather than the forward surface. Simultaneously, container 28 will move into the direct path of beam path 58, so that scanner 14 will scan a forward portion of container 28, rather than the rearward portion.

It can be seen that the entire perimeter surface of container 28 will be contacted by beam paths 50 and 58 as the container moves from position 1 through position 5, traveling through channel 24 between scanners 12 and 14 and the back mirror 62.

FIGS. 2 and 3 show a processor 66 in schematic form, which is operatively connected to both scanners 12 and 14 to receive and process the information which is scanned or "read" from scanners 12 and 14. this processed information may then be further utilized as necessary to track the specimen, direct processing or testing, or any other desired function.

Figure 4:
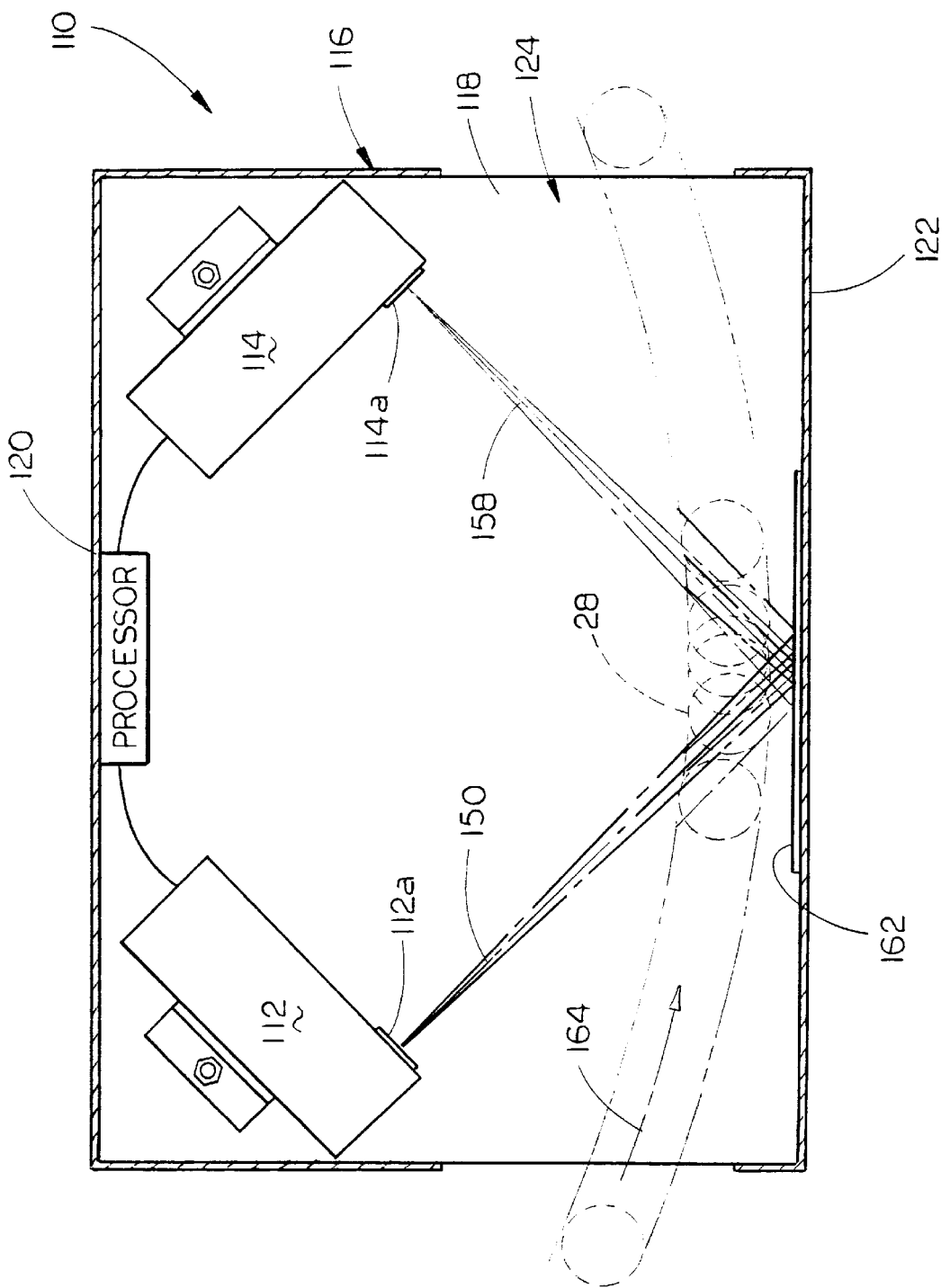
FIG. 4 is a sectional view similar to FIGS. 2 and 3 showing a second embodiment of the invention.

Referring now to FIG. 4, a second embodiment of the bar code reader is designated generally at 110 and includes a similar housing 116 with a forward wall 120, rearward wall 122, base plate 118, and channel 124. Scanners 112 and 114 are adjustably mounted within housing 116 and have windows 112a and 114a through which a beam path 150 and 158 respectively will pass for scanning. A back mirror 162 on rearward wall 122 serves to reflect beam paths 150 and 158 in a fashion similar to the first embodiment of the invention. A specimen container 28 will be directed along pathway 164 through channel 124 to scan the perimeter surface of container 28 for printed indicia or other desired information.

The main difference between the second embodiment 110 of bar code reader and the first embodiment 10 is in the orientation of scanners 112 and 114 to directly emit a beam path oriented towards back mirror 162, rather than bounding the beam path off first and second mirrors 46 and 54 of the first embodiment of the invention. It can be seen that beam paths 150 and 158 will cover the entire perimeter side wall of container 28 as the container moves along pathway 164, either directly or through a reflected path, reflected off of back mirror 162. Because mirrors 46 and 54 of the first embodiment of the invention are not used, bar code reader 110 will necessarily require a larger amount of space to permit the necessary distance between the scanners 112 and 114 form the specimen container 28 to be scanned.

Figure 5:
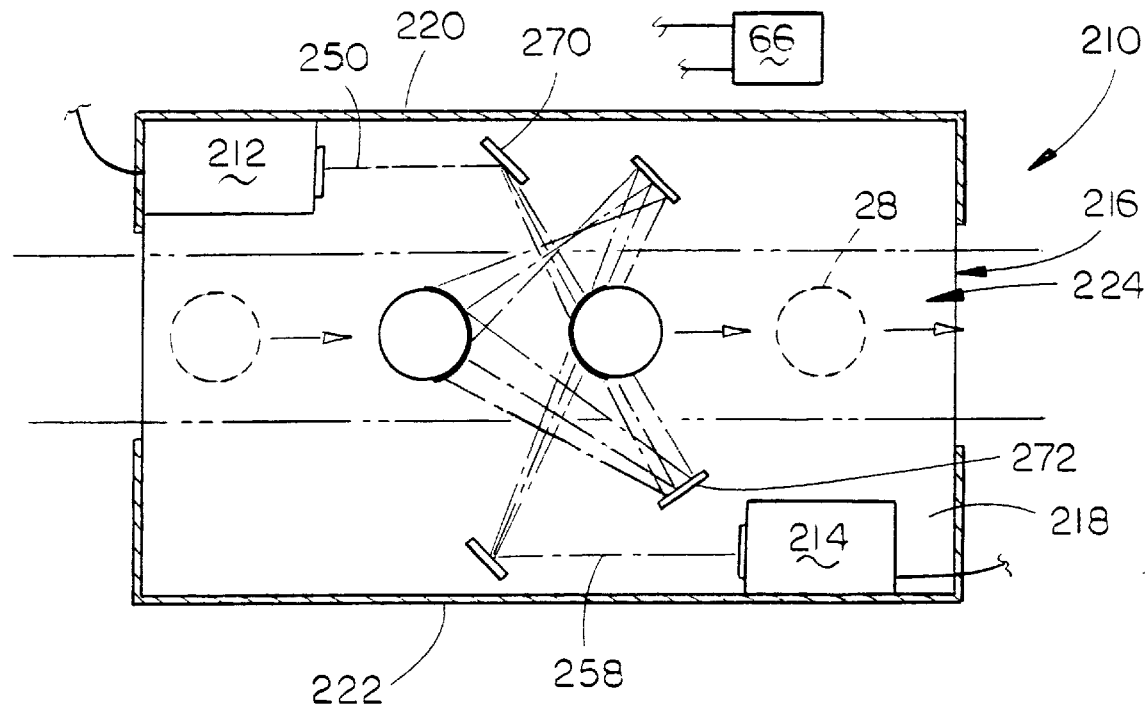
FIG. 5 is a schematic view of a third embodiment of a bar code reader.

Referring now to FIG. 5, a third embodiment of the bar code reader is designated generally at 210 and includes a similar housing 216 with a forward wall 220, rearward wall 222, base plate 218, and channel 224. Scanners 212 and 214 are adjustably mounted on opposite forward and rearward sides of the housing and oriented with their beam paths 250 and 258 directed in opposing directions, generally parallel to channel 224.

Scanner 212 has a first mirror 270 positioned in the beam path 250 to direct the beam path transversely across channel 224. A second mirror 272 is mounted on the opposite side of channel 224 from scanner 212, in the path of the reflected beam 250, and bounces the beam path back across channel 224 and back towards scanner 212, to scan the opposing perimeter surface of a specimen container 28 passing through channel 224.

Figure 6:
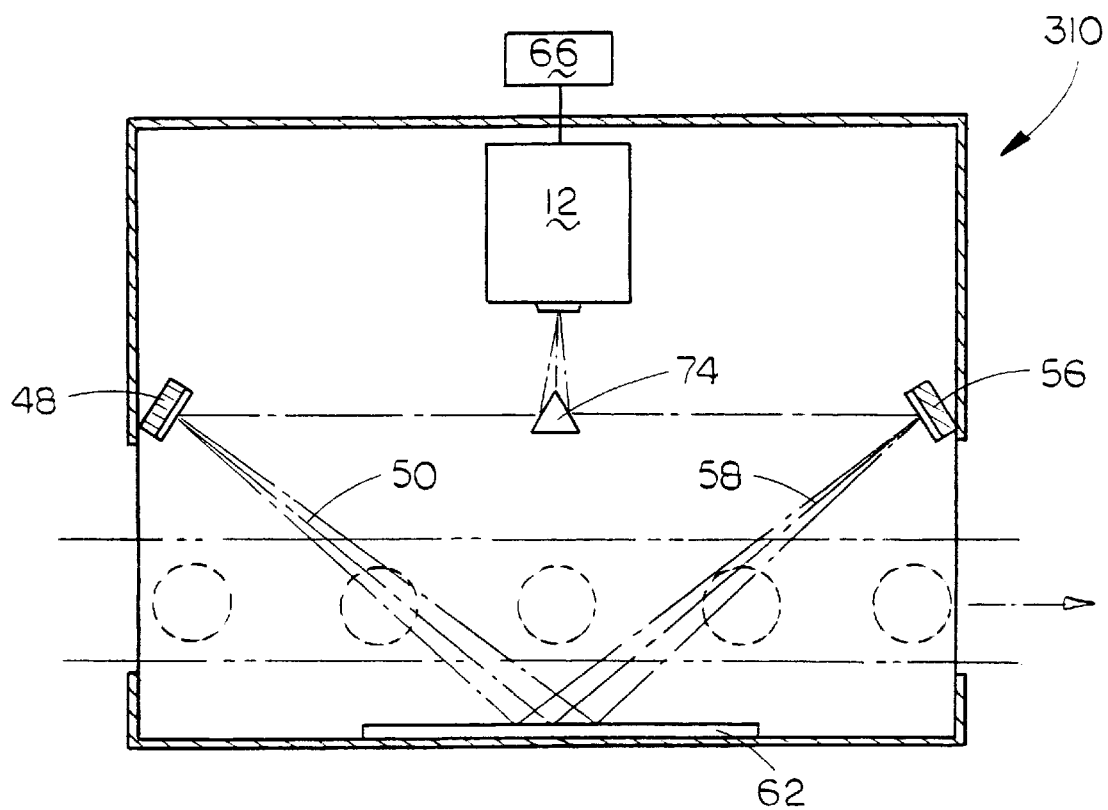
FIG. 6 is a schematic view of a fourth embodiment of the bar code reader of the present invention.

Referring now to FIG. 6, a fourth embodiment of the bar code reader is designated generally at 310 and utilizes an identical arrangement of mirrors 48 and 56 with back reflection mirror 62, as were used in the embodiment shown in FIGS. 2 and 3. The main difference between this embodiment and that shown in FIGS. 2 and 3 is the use of a single scanner 12 in conjunction with a dithering mirror or beam splitter 74 which will split the scanning beam 50 into a pair of beams 50a and 50b. In this way, a single scanner can be utilized to cover the entire perimeter side wall of container 28 as the container moves through channel 24.

Whereas the invention has been shown and described in connection with the preferred embodiment thereof, many modifications, substitutions and additions may be made which are within the intended broad scope of the appended claims.

We claim:

1. Apparatus for scanning an entire perimeter side wall of an object, comprising:

a first scanner having a window in a rearward end, and operable to selectively emit a scan beam along a beam path through the window;

means positioned in the beam path for dividing the beam path into first and second ancillary beam paths, said dividing means directing the ancillary beam paths in different directions;

first and second mirrors, positioned in the first and second ancillary beam paths, to reflect the beam paths rearwardly and towards one another within substantially the same plane; and a back mirror located rearwardly of the first and second mirrors to form a passageway between the back mirror and first and second mirrors, the back mirror positioned to reflect the beam paths from the first and second mirrors forwardly and substantially coplanar.

2. Apparatus for scanning an entire perimeter side wall of an object, comprising:

first and second scanners mounted on a housing, each scanner having a window and operable to selectively emit a scan beam along a beam path to the window;

at least one mirror connected to the housing and positioned to reflect the beam paths of the scanners, forming initial beam paths prior to reflection and reflected beam paths after reflection;

said at least one mirror positioned to form a passageway between the at least one mirror and the scanners, through which an object to be scanned is passed;

said at least one mirror being oriented to reflect the beam paths to scan an entire perimeter side wall of an object passing through the passageway;

said at least one mirror being oriented such that the passageway extends through both the initial and reflective paths of both beam paths;

said at least one mirror including a back mirror mounted such that the initial beam paths of the scanners reflect from the back mirror at approximately the same angle of incidence.

3. Apparatus for scanning an entire perimeter side wall of an object, comprising:

first and second scanners mounted on a housing, each scanner having a window and operable to selectively emit a scan beam along a beam path to the window;

at least one mirror connected to the housing and positioned to reflect the beam paths of the scanners, forming initial beam paths prior to reflection and reflected beam paths after reflection;

said at least one mirror positioned to form a passageway between the at least one mirror and the scanners, through which an object to be scanned is passed;

said at least one mirror being oriented to reflect the beam paths to scan an entire perimeter side wall of an object passing through the passageway;

said at least one mirror being oriented such that the passageway extends through both the initial and reflective paths of both beam paths;

said at least one mirror including a back mirror, and wherein said scanners are oriented to project a scan beam directly at the back mirror.

4. Apparatus for scanning an entire perimeter side wall of an object, comprising:

first and second scanners mounted on a housing, each scanner having a window and operable to selectively emit a scan beam alone a beam path to the window;

at least one mirror connected to the housing and positioned to reflect the beam paths of the scanners, forming initial beam paths prior to reflection and reflected beam paths after reflection;

said at least one mirror positioned to form a passageway between the at least one mirror and the scanners, through which an object to be scanned is passed;

said at least one mirror being oriented to reflect the beam paths to scan an entire perimeter side wall of an object passing through the passageway;

said at least one mirror being oriented such that the passageway extends through both the initial and reflective paths of both beam paths;

said at least one mirror including a back mirror, and first and second auxiliary mirrors, the first auxiliary mirror located to reflect the beam path of the first scanner from the scanner to the back mirror, the second auxiliary mirror located to reflect the beam path of the second scanner from the scanner to the back mirror, the portions of the beam paths between the auxiliary mirrors and the back mirror forming the initial portions of the beam paths.

5. Apparatus for scanning an entire perimeter side wall of an object, comprising:

first and second scanners mounted on a housing, each scanner having a window and operable to selectively emit a scan beam along a beam path to the window;

at least one mirror connected to the housing and positioned to reflect the beam paths of the scanners, forming initial beam paths prior to reflection and reflected beam paths after reflection;

said at least one mirror positioned to form a passageway between the at least one mirror and the scanners, through which an object to be scanned is passed;

said at least one mirror being oriented to reflect the beam paths to scan an entire perimeter side wall of an object passing through the passageway;

said at least one mirror being oriented such that the passageway extends through both the initial and reflective paths of both beam paths;

said scanners both being mounted in a forward portion of the housing;

said at least one mirror including a back mirror mounted in a rearward portion of the housing;

the passageway extending between the scanners and the back mirror;

the scanners being mounted with their beam paths directed in opposite directions, and said at least one mirror including first and second auxiliary mirrors, the first auxiliary mirror located to reflect the beam path of the first scanner from the scanner to the back mirror, the second auxiliary mirror located to reflect the beam path of the second scanner from the scanner to the back mirror.

6. Apparatus for scanning an entire perimeter side wall of an object, comprising:

first and second scanners mounted on a housing, each scanner having a window and operable to selectively emit a scan beam along a beam path to the window;

at least one mirror connected to the housing and positioned to reflect the beam paths of the scanners, forming initial beam paths prior to reflection and reflected beam paths after reflection;

said at least one mirror positioned to form a passageway between the at least one mirror and the scanners, through which an object to be scanned is passed;

said at least one mirror being oriented to reflect the beam paths to scan an entire perimeter side wall of an object passing through the passageway;

said at least one mirror being oriented such that the passageway extends through both the initial and reflective paths of both beam paths;

the first scanner being mounted in a forward portion of the housing, and the second scanner being mounted in a rearward portion of the housing, the passageway extending between the scanners.

7. The apparatus of claim 6, wherein said at least one mirror includes:

a first mirror positioned in the first scanner beam path to reflect the path rearwardly across the passageway to form the initial first beam path;

a first back mirror positioned rearwardly of the passageway and oriented to reflect the first scanner beam path forwardly across the passageway, to form the reflected first beam path;

a second mirror positioned in the second scanner beam path to reflect the path forwardly across the passageway to form the initial second beam path; and a second back mirror positioned forwardly of the passageway and oriented to reflect the second scanner beam path rearwardly across the passageway to form the reflected second beam path.

8. The apparatus of claim 7, wherein the first and second scanners are oriented so as to emit scan beams in generally parallel and opposite directions.

9. A scanning apparatus, comprising:

first and second scanners mounted on a forward portion of a housing, each scanner having a window and being operable to selectively emit a scan beam along a beam path through the window;

said first and second scanners positioned such that their respective beam paths have an initial portion of the beam path projecting rearwardly; and a back mirror located in the beam paths and oriented to reflect the beam paths in a forward direction; said back mirror spaced rearwardly from the scanners to form a passageway between the scanners and mirror passing through both the initial and reflected portions of the beam paths.

10. The apparatus of claim 9, wherein said scanners are oriented to project a scan beam directly at the back mirror.

11. The apparatus of claim 9, further comprising first and second auxiliary mirrors, the first auxiliary mirror located to reflect the beam path of the first scanner from the scanner to the back mirror, the second auxiliary mirror located to reflect the beam path of the second scanner from the scanner to the back mirror.

\* \* \* \* \*